Sept. 5, 1950 C. GERST 2,521,289
COUPLING
Filed June 3, 1946

INVENTOR.
CHRIS GERST
BY Gustav A. Wolff
ATT.

Patented Sept. 5, 1950

2,521,289

UNITED STATES PATENT OFFICE 2,521,289

COUPLING

Chris Gerst, Detroit, Mich., assignor to The Transmission & Gear Company, Dearborn, Mich., a corporation of Michigan Application June 3, 1946, Serial No. 674,023

4 Claims. (Cl. 64—7)

This invention relates in general to couplings and, more particularly, to universal couplings suitable for connecting angularly related shafts.

It is the primary object of the invention to provide a simple, efficient and economic universal coupling for angularly related shafts, which coupling is constructed to directly and positively transfer power from a driving member to a driven member, so as to eliminate undesirable stresses in the coupling and excessive wear on the elements of the coupling.

Such a primary object of the invention is attained by a coupling constructed to include a driving member and a driven member intersleeved with each other, and a power transferring pin member arranged in the overlapping portions of said members and coupled with one of said members, so that the axis of the pin member extends through the intersecting point of the axes of the driving and driven members.

Another object of the invention therefore is the provision of a universal coupling having intersleeved driving and driven members coupled by a driving pin mounted in one of said members and in driving contact with the other one of said members, and the driving pin positioned to axially intersect the intersecting point of the axes of said driving and driven members.

The universal action of such a coupling according to the invention is attained by extending the driving pin through a double-cone-shaped bore in one of the intersleeved members to effect during driving operations frictional driving contact of the driving pin with the wall of such bore.

A further object of the invention therefore is the provision of a universal coupling having intersleeved driving and driven members coupled by a driving pin with each other, one of said members mounting the driving pin and the other one of said members including a double-cone-shaped bore for such driving pin to permit universal tilting of the driving pin during frictional driving contact with the wall of the bore in the other one of said members.

Still further objects and novel features of construction, combination and relations of parts by which the objects in view have been attained, will appear and are set forth in detail in the course of the following specification. The drawings accompanying and forming part of the specification illustrate certain practical embodiments of the invention, but it will be apparent as the specification proceeds that the structure may be modified and changed in various ways without departure from the true spirit and broad scope of the invention.

Figure 1:
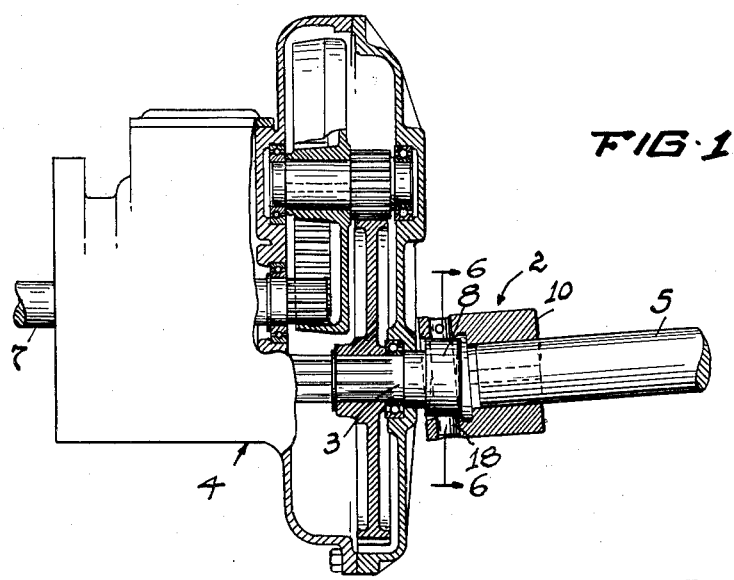
Fig. 1 is a longitudinal, sectional view (partly in elevation) through a transmission coupled with a shaft by a coupling constructed in accordance with the invention.
Figure 2:
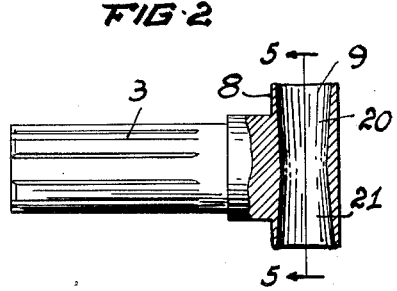
Fig. 2 is a side-view (partly in section) of a driven shaft having its one end portion shaped to form one of the members of the coupling shown in Fig. 1.
Figure 3:
Fig. 3 is a side-view of the driving pin of the coupling.
Figure 4:
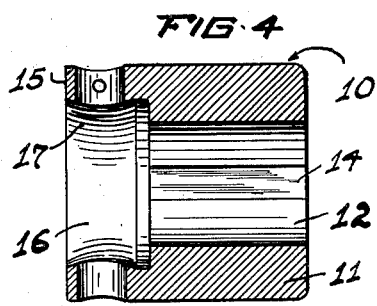
Fig. 4 is a longitudinal, sectional view through the other member of the coupling shown in Fig. 1.
Figure 5:
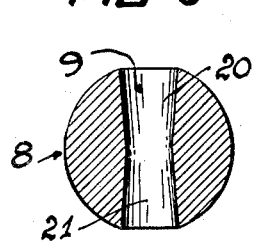
Fig. 5 is a cross sectional view through the end portion of the shaft shown in Fig. 2, the section being taken on line 5—5 of Fig. 2.
Figure 6:
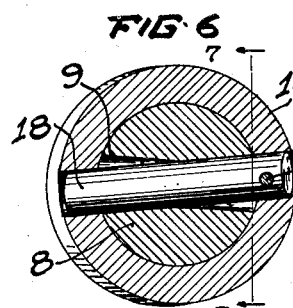
Fig. 6 is a cross sectional view through the coupling shown in Fig 1, the section being taken on line 6—6 of Fig. 1.
Figure 7:
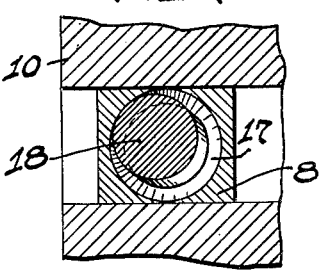
Fig. 7 is a sectional view through Fig. 6, the section being taken on line 7—7 of Fig. 6.

Referring now in detail to the exemplified form of coupling shown in the drawings, reference numeral 2 designates a coupling connecting the output shaft 3 of a transmission 4 with a driven shaft 5. Output shaft 3 is coupled with the input shaft 7 of the transmission and has at its outer end an enlarged cylindrical head 8 formed with a double-cone-shaped bore 9 rectangularly related to the axis of said head. Head 8 is extended into a sleeve 10 which includes at its one end 11 a bore 12 with a keyway 14 for slidable and non-rotatable engagement with driven shaft 5 and encircles with its other end 15 head 8. For such purpose, end 15 is provided with an axial bore 16 dimensioned to closely fit head 8. Bore 16 has an inwardly curved side wall 17 to permit tilting between head 8 and sleeve 10 for proper alignment of the sleeve with driven shaft 5. A driving pin 18 couples sleeve 10 with head 8, and this pin is mounted in said sleeve so as to intersect the axis of the sleeve at a right angle and to extend radially through curved side wall 17 of bore 16. Driving pin 18 is fully extended through the double-cone-shaped bore 9 of head 8 and in driving operations contacts and slides over opposite wall portions of the two cone-shaped bores 20 and 21 which form the double bore 9. A locking pin 22 secures the driving pin to the sleeve and prevents axial shifting of the pin during driving operations when the pin while sliding over the wall of double-cone-shaped bore 9 is tilted on the intersecting point of the axes of output shaft 3 and driven shaft 5.

Axial relation of cylindrical head 8 and sleeve 10 is controlled by inwardly curved side wall 17 of bore 16 which effects that the axes of shafts 3 and 5 in all possible angular positions intersect each other at the same point, by driving pin 18 mounted in sleeve 10 to radially extend through the curvature of the side wall, and by the size of the intersecting area of the two cone-shaped bores 20 and 21, which area equals the cross section of the driving pin. The coupling shown has its one member, cylindrical head 8, formed as an integral part of output shaft 3 but may be constructed as a unit with a head 8 constructed to include means for securing the head to a shaft.

Couplings of the type described are well suited for coupling substantially aligned shafts and effect smooth transfer of power, as driving pin 18 is in partly frictional engagement with wall 17 of double-cone-shaped bore 9.

Figure 8:
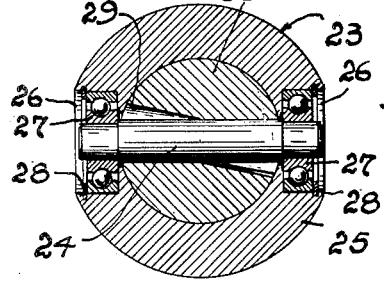
Fig. 8 is a cross sectional view similar to Fig. 6 of a somewhat modified form of coupling.

The modified structure of coupling 23 shown in Fig. 8 is particularly suitable for coupling angularly related shafts which run at high speeds. Coupling 23 in general is constructed similar to the coupling previously described with the exception that driving pin 24 is freely rotatably mounted in sleeve 25. This sleeve includes circular recesses 26 for ball bearings 27 (roller or needle bearings may also be used if so desired) freely rotatably supporting the opposite ends of driving pin 24 and held against axial movements by split rings 28. The mounting of driving pin 24 substantially decreases friction between pin 24 and the wall of double-cone-shaped bore 29 in head 30, as pin 24 is rotated when in driving engagement with the wall of bore 29.

Having thus described my invention what I claim is:

1. In a universal coupling a first coupling member with a bore having its side wall curved toward the axis of said bore, a second cylindrical coupling member extended into the bore of said first coupling member and dimensioned to contact in all possible positions the curved side wall of the bore of said first coupling member, a double-cone-shaped cross passage in the end portion of said second coupling member, and a driving pin extended through said passage and having its ends mounted in bores in the curved side wall of said first coupling member.

2. In a universal coupling a female coupling member including a bore having its side wall curved toward the axis of said bore, a cylindrical male coupling member extended into said bore and dimensioned to contact in all possible positions the curved side wall of said female coupling member, said male coupling member having a double-cone-shaped bore in its end portion, and a driving pin extended through said double-cone-shaped bore of said male coupling member and mounted in the opposed curved wall portions of said female coupling member in rectangular relation to the axis of said bore.

3. A universal coupling as described in claim 2, wherein said driving pin is freely, rotatably mounted in diametrically opposed, curved wall portions of said female coupling member to permit free rolling contact of the middle portion of the driving pin with the walls of the double-cone-shaped bore.

4. A universal coupling as described in claim 2, wherein ball bearings are mounted in diametrically opposed, curved wall portions of said female coupling member, and wherein said driving pin is carried by said ball bearings to permit free rolling contact of the middle portion of the driving pin with the walls of the double-cone-shaped bore.

CHRIS GERST.

REFERENCES CITED

The following references are of record in the file of this patent:

UNITED STATES PATENTS

| Number | Name | Date |
| --- | --- | --- |
| 123,049 | Roper et al. | Jan. 23, 1872 |
| 1,225,524 | Swartz | May 8, 1917 |
| 1,903,576 | Skeel et al. | Apr. 11, 1933 |

FOREIGN PATENTS

| Number | Country | Date |
| --- | --- | --- |
| 13,274 | France | 1910 |